United States Patent [19]

Barton et al.

[11] 3,878,358

[45] Apr. 15, 1975

[54] DIGITAL POWER CONTROL

[75] Inventors: Edward D. Barton; James M. Donohue, both of Rochester, NY

[73] Assignee: Xerox Corporation, Stamford, Conn.

[22] Filed: June 10, 1974

[21] Appl. No.: 478,006

Related U.S. Application Data

[63] Continuation of Ser. No. 307,302, Nov. 16, 1972, abandoned.

[52] U.S. Cl. .................. 219/216; 219/497; 219/505

[51] Int. Cl. .............................................. H05b 1/02

[58] Field of Search ........... 219/216, 388, 497, 501, 219/504, 505; 307/310

[56] References Cited

UNITED STATES PATENTS

| | | | |
|---|---|---|---|
| 3,558,853 | 1/1971 | Schluntz | 219/388 X |
| 3,584,291 | 6/1971 | Budnick et al. | 219/501 X |
| 3,678,247 | 7/1972 | Sawa et al. | 219/501 |

*Primary Examiner*—C. L. Albritton

[57] ABSTRACT

A digital power control utilizing zero voltage switching of silicon controlled rectifiers and achieving full isolation of the load from the control circuitry. A thermistor is employed to determine the temperature of the load and a voltage step generator is utilized in conjunction with the thermistor to effect a control of the number of cycles of power to apply to the load.

9 Claims, 2 Drawing Figures

DIGITAL POWER CONTROL

This is a continuation of application Ser. No. 307,302, filed Nov. 16, 1972, now abandoned.

BACKGROUND OF THE INVENTION

This invention relates to digital logic control circuitry and, more particularly, to digital logic circuitry for controlling the rate at which power is applied to a heat source.

There are many instances where it is required to control the temperature of a heat source. In many cases, these heat sources operate in several different modes. One example is fusing apparatus incorporated in a xerographic copying machine. Such apparatus can be considered to operate in three separate modes. The first of these modes is the warmup mode when the machine is first turned on and the fuser temperature is brought up to a certain predetermined level. The second mode is the standby mode where the fusing apparatus is kept at the predetermined temperature. The third mode is the print mode where the fuser temperature is raised to a higher level in order to effect fusing of toner particles onto a support sheet. In the prior art, various methods of achieving the required control have been implemented. These methods have varied from very simple temperature sensitive on-off switches to highly sophisticated control systems. It would be desirable to obtain a control system which is highly sophisticated yet very reliable, economical and safe.

SUMMARY OF THE INVENTION

In accordance with principles illustrative of this invention, apparatus is provided for generating a monotonic response function. Illustratively, circuitry is advantageously provided for controlling the temperature of a heat source in three different modes of operation. The circuitry utilizes digital logic principles and implements zero voltage switching of silicon controlled rectifiers. A thermistor is used as a temperature sensor. A voltage step generator provides eight voltage steps which are compared with the output of the thermistor. This comparison enables increments of power to be applied to the heat source, ranging from one eighth to full power. Each increment of power is a full sine wave cycle and the silicon controlled rectifiers are switched so as to allow the determined number of power cycles to be applied to the heat source, depending upon the mode of operation and the temperature of the heat source.

DESCRIPTION OF THE DRAWING

The foregoing will become more readily apparent upon reading the following description in conjunction with the drawing in which.

GENERAL DESCRIPTION

Figure 1:
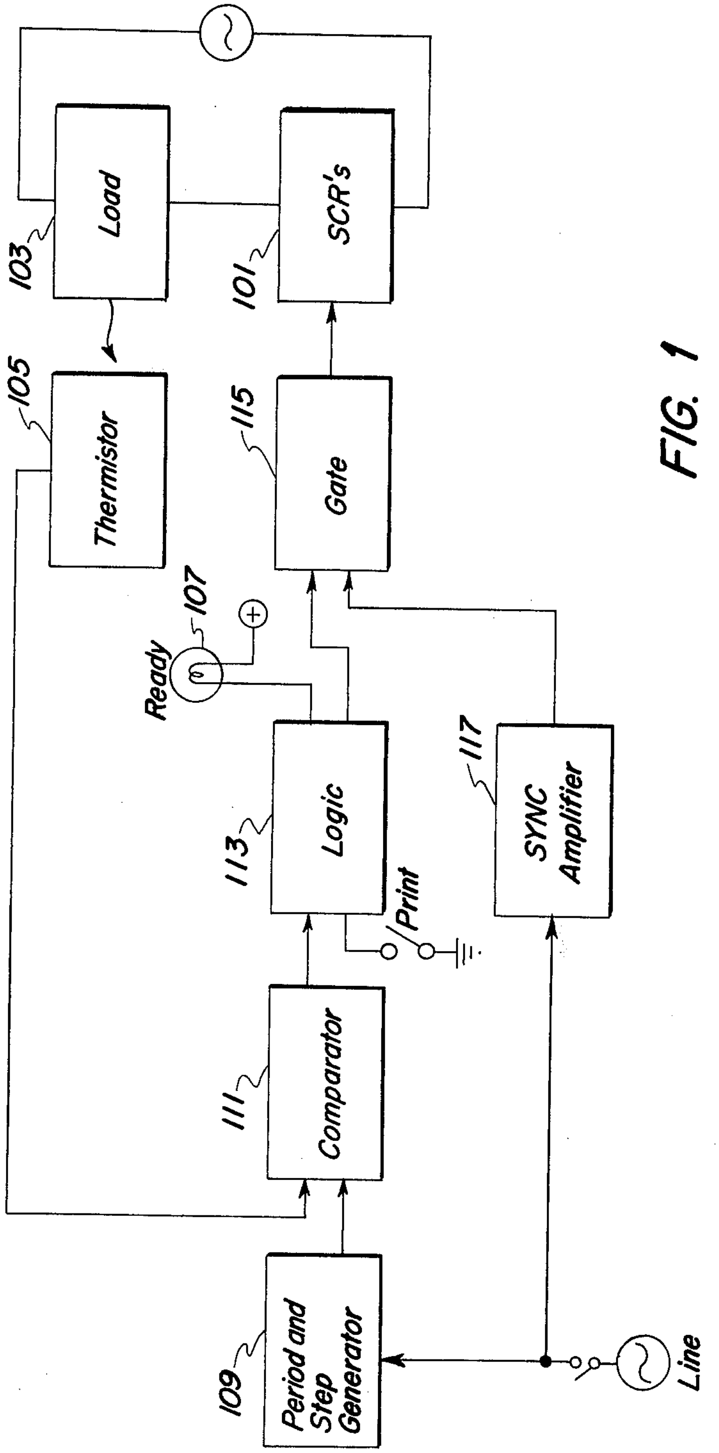
FIG. 1 depicts a schematic block diagram of an illustrative control system embodying the principles of this invention.

Turning now to FIG. 1, depicted therein is a schematic block diagram of an illustrative embodiment of this invention. The illustrative embodiment shown uses silicon controlled rectifiers 101 to control the application of power to load 103. To sense the temperature of load 103, a negative temperature coefficient resistor (thermistor) 105 is utilized. The circuit design is such that the SCR's are turned on and off during minimum current flow. This technique is commonly called "zero voltage switching" and is a reliable method for preventing electromagnetic interference. It is characteristic of zero voltage switching that power is applied to the load starting when the line voltage is near zero and just beginning to increase, and ending when the line voltage returns to zero. Since the SCR's are used in a full wave configuration, this means that power can be applied to the load in full sine wave increments. To achieve the precise control required, the full sine waves are applied to the load on a periodic basis, repeated every eight sine waves. Therefore, it is possible to apply power to the load in increments of one eighth the maximum load.

Before going into the details of operation of the system depicted in FIG. 1, it would be appropriate at this point to functionally explain the control to be implemented. Assuming initially that no power is applied to the load, when the power is first turned on, the thermistor will be cold. Therefore, at this point in time, full power would be applied to the load. This is the warmup mode. When the thermistor heats up, its resistance will decrease, indicating that less power is required. At this point, one out of the eight sine wave cycles will be removed from application to the load. As the thermistor continues to heat up, another sine wave cycle will be removed, corresponding to six eighths of full power being applied to the load. This progressive decrease in power applied to the load will continue until only four eighths power is applied. At this point, ready lamp 107 will be turned on. This indicates that the apparatus is in the standby mode and the control system will permit either one sine wave cycle or no sine wave cycles to be applied to the load, depending upon the temperature of the thermistor. Operation in this manner (i.e., standby mode) will continue until such time as the print button is actuated. When the print button is actuated, the control system goes into the print mode and a minimum of two out of eight sine wave cycles will be applied to the load. However, depending upon the temperature indicated by the thermistor, up to full power can be applied. Releasing the print button will permit the control to revert to the standby mode.

Returning now to FIG. 1, period and step generator 109 generates eight voltage steps over a period of 132.8 milliseconds. Therefore each voltage step takes 16.6 milliseconds, or the period of 1 cycle of standard 60 cycle power. Comparator 111 has as its input the voltage steps from generator 109 as well as the output of thermistor 105. Comparator 111 is basically a differential amplifier followed by a Schmidt trigger. It compares the voltage level from the thermistor with the voltage steps and, if there is a difference of the correct polarity, a signal is sent to logic 113. Logic 113 determines the mode of operation of the control system, how many cycles of power are to be applied to load 103, and actuates gate 115 to turn on SCR's 101 at the proper time. Sync amplifier 117 converts sine waves at the line frequency into pulses of the proper polarity and transmits them to gate 115 in order to insure that the firing pulses into SCR's 101 occur at the right time in order to achieve zero voltage switching.

DETAILED DESCRIPTION

Figure 2:
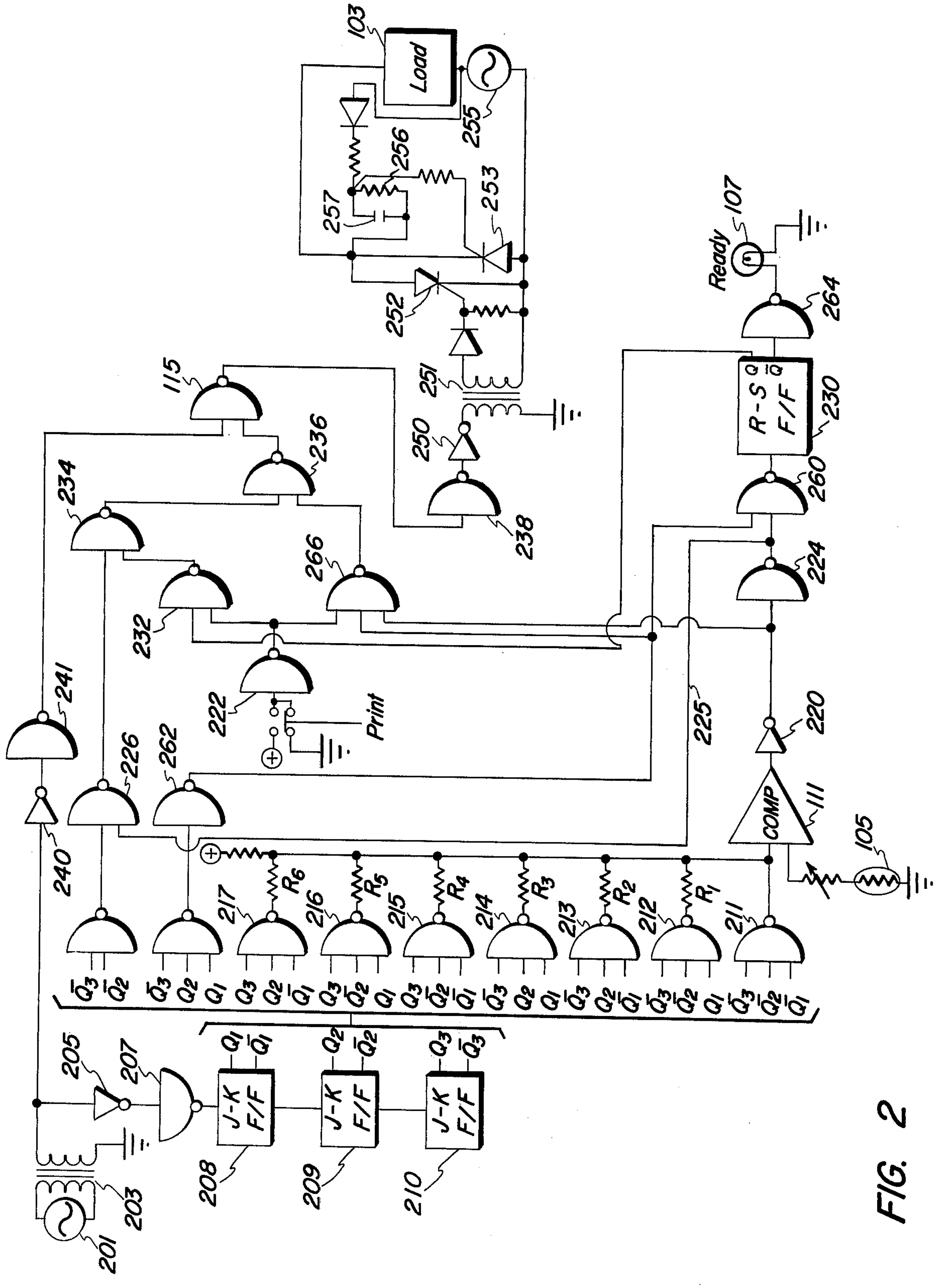
FIG. 2 depicts a more detailed logical schematic circuit diagram of the system of FIG. 1.

Referring now to FIG. 2, depicted therein is a detailed logical schematic diagram of an illustrative circuit which may be used as the control system whose block diagram is depicted in FIG. 1. In the following discussion, the terms ZERO and ONE will be used to describe logic levels. The term ZERO will mean no signal or a ground and the term ONE will refer to a signal at a positive voltage level. The logical elements utilized in FIG. 2 are for the most part NAND gates which have as their output a ZERO if and only if all of the inputs thereto are at ONE. Otherwise, the output of a NAND gate is a ONE.

The sine wave signal from source 201 passes through transformer 203 and into amplifier 205 and gate 207 where it is squared, inverted and the signal is thereby isolated from the line. From the output of gate 207 the square wave is directed into a binary counter chain consisting of J-K flip-flops 208, 209 and 210 arranged in standard configuration. Connected to the outputs of flip-flops 208, 209 and 210 are seven NAND gates 211 . . . 217 which act as decoders of the states of flip-flops 208, 209, 210 on a periodic basis. Connected to the output of decoder gates 211 . . . 217 are resistors $R_1$ . . . $R_6$ which illustratively obey the relationship $R_6>R_5>R_4>R_3>R_2>R_1$. These resistors permit each of the decoded outputs to be at a different voltage level, thereby forming a voltage step sequence which is repeated every eight sine waves from the line. It should be noted at this point that the magnitudes of the resistors can obey any other ordered relationship. The present invention contemplates the generation of a monotonic response of a general shape through the use of discrete programmable resistance values. This voltage step sequence comprises one input to comparator 111. The other input of comparator 111 is connected to thermistor 105, which senses the temperature of load 103. The output of comparator 111 is either ZERO or ONE, and will be at ZERO or ONE for all or part of the eight sine wave period, depending upon whether thermistor 105 is hot or cold. The output of comparator 111 is amplified and inverted by amplifier 220.

To trace the logic further from this point, a warmup mode is assumed. This would mean that thermistor 105 is cold, giving a ONE output from amplifier 220. The ONE output of amplifier 220 is inverted by gate 224 to produce a ZERO on line 225, thereby producing a ONE at the output of gate 226. Let it now be assumed that by circuitry not shown flip-flop 230 is in the reset state with Q = ZERO, thereby causing the output of gate 232 to be at ONE. Since the output of gates 232 and 226 are both ONE, the output of gate 234 is ZERO. Therefore, the output of gate 236 is a ONE. The line signals from transformer 203 pass through sync amplifier 240 and inverter 241 producing a series of ONE pulses of 0.5 millisecond duration spaced 16 milliseconds apart. This causes the ONE output from gate 236 to be effectively split up into a series of ZERO pulses at the output of gate 115. From this point these ZERO pulses are inverted by gate 238 and pass through amplifier 250 into transformer 251. This triggers SCR 252 to allow the power from source 255 to pass through load 103. Each pulse from transformer 251 triggers SCR 252 to allow half a sine wave to pass through load 103 while SCR 253 is triggered through the RC combination 256 and 257 to allow the other half sine wave to pass through load 103. Therefore, each pulse from gate 115 allows one complete sine wave of power from source 255 to pass through load 103, thereby heating load 103. As load 103 heats up, the resistance of thermistor 105 decreases. Comparator 111 therefore eventually gets a ONE output after only seven of the eight voltage steps. This causes removal of one out of eight sine waves of power applied to load 103. Increased heating of load 103 results in more sine waves of power being removed from application to load 103.

The warmup mode continues until thermistor 105 causes comparator 111 to remove four sine waves of power applied to load 103. At this point the following takes place. Throughout the warmup mode the output of gate 260 into flip-flop 230 was ONE, maintaining flip-flop 230 in the state Q = ZERO; $\overline{Q}$ = ONE. Continue the assumption that for over half the time period, the output of amplifier 220 is at ONE. A ONE pulse from gate 262 occurs at the fourth of eight sine waves. When the output of amplifier 220 becomes a ZERO for more than four sine waves, both input terminals of gate 260 become ONE and thus cause a ZERO at its output. This triggers flip-flop 230, causing a ONE at the output of gate 264, lighting ready lamp 107. This is the standby mode and one or no sine waves will appear in the load, depending upon the temperature of thermistor 105. In this standby mode, the one or no sine wave is generated in the following manner. Flip-flop 230 is set with Q = ONE in the standby mode. This ONE signal is transferred to gate 232 which causes the output of gate 232 to be a ZERO since its other input is also a ONE, the print button not being depressed. This ZERO output from gate 232 causes the output of gate 234 to be a ONE. If thermistor 105 is not too hot, the output of gate 266 will be ZERO only during one pulse out of eight. Therefore, the output of gate 236 will be a ONE only for one pulse out of eight. This will combine with the pulses from gate 241 to produce a ZERO pulse at the output of 115 only one pulse out of eight. Therefore only one out of eight sine waves from source 255 will be allowed to pass through load 103.

Let us now assume that the print mode is initiated by depression of the print button, thereby placing a ONE at the input to gate 222. The output of gate 222 then becomes a ZERO, this signal being directed toward both gates 232 and 266. The outputs of both these gates are then ONE. The ONE output of gate 232 is then directed to the input of gate 234. The output of gate 226 is a ONE except for two eighths of the period. Therefore the output of gate 234 will be a ZERO for six eighths of the period. The output of gate 236 thus becomes a ONE for six eighths of the period and is transmitted to gate 115 where it is combined with the pulses from gate 241 to trigger SCR 252 for six out of the eight possible sine waves, thereby causing load 103 to heat up. It should be noted at this point that due to the unique arrangement at gate 226, if thermistor 105 indicates that no heat is required, the signal on lead 225 will be a ONE. But due to the signal on the other input of gate 226 receiving two ZERO pulses, these pulses will cause two sine waves to pass through load 103. In the event that the thermistor 105 indicates that heat is required, lead 225 can stay ZERO for the entire period of eight sine waves and thus cause up to eight sine waves to pass through load 103.

Accordingly, there has been shown an arrangement for controlling the power applied to a heat source. It is understood that the above-described arrangement is merely illustrative of the application of the principles of this invention. Numerous other arrangements may be devised by those skilled in the art without departing from the spirit and scope of the invention.

What is claimed is:

1. In a xerographic machine operable in three separate modes of warmup, standby, and print and having control apparatus for regulating the temperature of a fusing device during the modes, said control apparatus comprising, means responsive to the temperature of the fusing device for providing a temperature signal which varies as a function of the temperature, binary-counter means having an input and a plurality of outputs, with the outputs changing in response to variations in AC signals applied to the input, which are related to variations of AC energy coupled to the fusing device, generator means coupled to the outputs of the binary-counter means to generate a periodic series of electrical signals, the length of each signal being substantially equal in time to one full cycle of the AC signals, means for comparing the temperature signal and the periodic signals to generate a difference signal indicative of the difference between the temperature and periodic signals, switching means actuatable to couple an AC energy source to the fusing device, and gating means coupled to the input of the switching means and responsive to the binary-counter means and the comparator means for applying a different combination of actuating signals to the switching means, for the different modes of the xerographic machine, to couple a number of full cycles of AC energy to the fusing device corresponding to the combination of actuating signals.

2. The apparatus of claim 1 wherein the gating means comprises a standby-mode detection means responsive to a predetermined difference signal to switch from the warmup mode to the standby mode for enabling the generation of a combination of actuating signals corresponding to the difference signal during the warmup mode and for enabling the generation of a single actuating signal during the standby mode provided said predetermined difference signal is detected.

3. The apparatus of claim 1 wherein the gating means comprises a print-mode detector means responsive to a manual control means to switch from the standby mode to the print mode for enabling the generation of a combination of actuating signals corresponding to the difference signal except that a fixed combination of actuating signals are enabled when the difference signal is less than a predetermined minimum.

4. The apparatus of claim 1 wherein the generator means comprises a plurality of gates, each having a load resistor and being sequentially enabled by the outputs of the binary-counter means, the values of the load resistors obeying a predetermined ordered relationship so as to provide a predetermined magnitude to each of the electrical signals in the periodic series.

5. The apparatus of claim 4 wherein the plurality of gates comprises seven gates.

6. The apparatus of claim 4 wherein the periodic series of electrical signals comprises eight voltage steps over a period of 132.8 milliseconds.

7. The apparatus of claim 4 wherein the load resistors increase in value from the load resistor for the gate which is first enabled to the load resistor for the gate which is last enabled.

8. The apparatus of claim 4 wherein the load resistors decrease in value from the load resistor for the gate which is first enabled to the load resistor for the gate which is last enabled.

9. The apparatus of claim 4 wherein the load resistors alternately increase and decrease in value with respect to the previous resistor, from the load resistor for the gate which is first enabled to the load resistor for the gate which is last enabled.

* * * * *